United States Patent
Maeda

[11] Patent Number: 5,811,728
[45] Date of Patent: Sep. 22, 1998

[54] WATERPROOF RUBBER TAP AND WATERPROOF CONNECTOR

[75] Inventor: Akira Maeda, Shizuoka, Japan

[73] Assignee: Yazaki Corporation, Tokyo, Japan

[21] Appl. No.: 404,451

[22] Filed: Mar. 15, 1995

[30] Foreign Application Priority Data

Mar. 18, 1994 [JP] Japan .................................. 6-049128
Sep. 9, 1994 [JP] Japan .................................. 6-216108

[51] Int. Cl.⁶ ................................................. H02G 3/18
[52] U.S. Cl. .......................... 174/65 R; 174/152 G; 16/2.2; 248/56
[58] Field of Search .................. 174/152 G, 153 G, 174/64, 65 SS, 65 R, 11 BH, 14 BH, 65 G, 151, 135; 248/56; 16/2.1, 2.2

[56] References Cited

U.S. PATENT DOCUMENTS

| | | | |
|---|---|---|---|
| 3,244,802 | 4/1966 | Sturtevant | 174/153 |
| 3,285,551 | 11/1966 | Tschanz | 248/56 |
| 4,797,513 | 1/1989 | Ono et al. | 174/153 |
| 4,874,325 | 10/1989 | Bensing et al. | 439/272 |
| 5,270,487 | 12/1993 | Sawamura | 174/31 R |
| 5,453,579 | 9/1995 | Cohea | 174/153 G |

*Primary Examiner*—Kristine L. Kincaid
*Assistant Examiner*—Dhiru R. Patel
*Attorney, Agent, or Firm*—Sughrue, Mion, Zinn, Macpeak & Seas, PLLC

[57] ABSTRACT

The waterproof rubber tap is a cylindrical waterproof rubber tap structured such that, when an electric wire is inserted through the inner peripheral portion thereof and it is inserted together with the inserted electric wire into an electric wire insertion passage formed in a connector housing, it can seal, that is, can prevent water from getting into between the electric wire and electric wire insertion passage. The waterproof rubber tap includes, on the outer periphery of the opposite end portion to the insertion side thereof, a tapered sealing annular projecting portion having an outside diameter increasing toward the opposite direction to the insertion direction thereof. The tapered sealing annular projecting portion also includes an end portion having an outside diameter greater than the inside diameter of the electric wire insertion passage.

12 Claims, 7 Drawing Sheets

WATERPROOF RUBBER TAP AND WATERPROOF CONNECTOR

BACKGROUND OF THE INVENTION

1. Field of the Invention

An electric wire with its terminal stored within a connector housing is drawn out externally from an electric wire insertion passage formed in the rear end of the connector housing. On the outer periphery of the electric wire, there is mounted a waterproof rubber tap which keeps the area between the electric wire and the electric wire insertion passage waterproof to thereby prevent water from flowing into the connector housing.

2. Related Art

Figure 17:
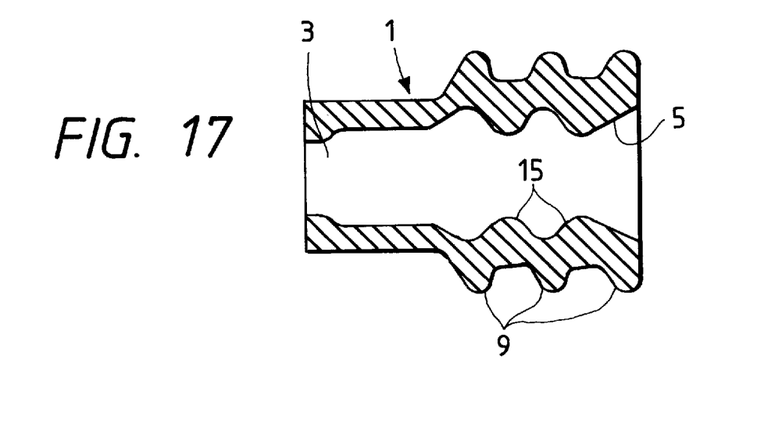
FIG. 17 is a section view of a conventional waterproof rubber tap.
Figure 18:
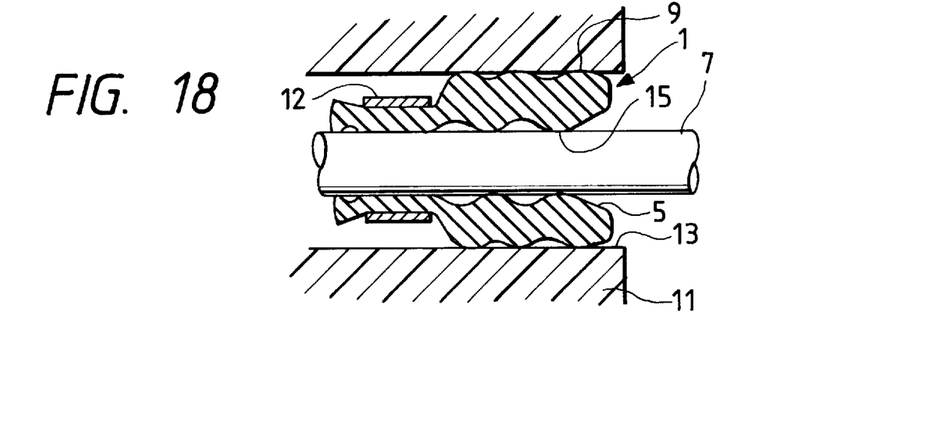
FIG. 18 is a section view of a conventional waterproof rubber tap mounted to a connector housing.

As an example of conventional waterproof rubber taps of the above type, in Japanese Patent Publication No. 62-163879 of Showa, there is disclosed a waterproof rubber tap which includes, on the cylindrical inner and outer peripheral portions thereof, annular bulge portions to prevent entrance of water. A description will be given below of this conventional waterproof rubber tap with reference to FIGS. 17 and 18. In particular, FIG. 17 is a section view of the conventional waterproof rubber tap, and FIG. 18 is a section view of the conventional waterproof rubber tap which is mounted to a connector housing.

A waterproof rubber tap 1 includes an electric wire insertion hole 3 and a tapered portion 5 which is formed in the entrance edge portion of the electric wire insertion hole 3 and is widened outwardly. This tapered portion 5 facilitates the insertion of an electric wire 7 (see FIG. 18). The waterproof rubber tap 1 further includes in the outer periphery thereof a plurality of annular projections 9 for sealing, while the outside diameter of the annular projection 9 is set slightly larger than the inside diameter of an electric wire insertion passage 13 formed in a connector housing 11. Also, in the inner wall of the electric wire insertion hole 3, there are formed a plurality of annular bulge portions 15, while the inside diameter of the bulge portion 15 is set slightly smaller than the outside diameter of the electric wire 7.

Therefore, if the electric wire 7 with the waterproof rubber tap 1 mounted thereon by fastening a terminal 12 tight and integrally to the tap 1, is inserted into the electric wire insertion passage 13 formed in the connector housing 11, then the annular projections 9 are compressed and contact closely with the inner wall of the electric wire insertion passage 13. The bulge portions 15 are also compressed and contact closely with the outer periphery of the electric wire 7 to make airtight the area between the electric wire, 7 and electric wire insertion passage 13, thereby preventing water from penetrating into the connector housing 11.

Figure 19:
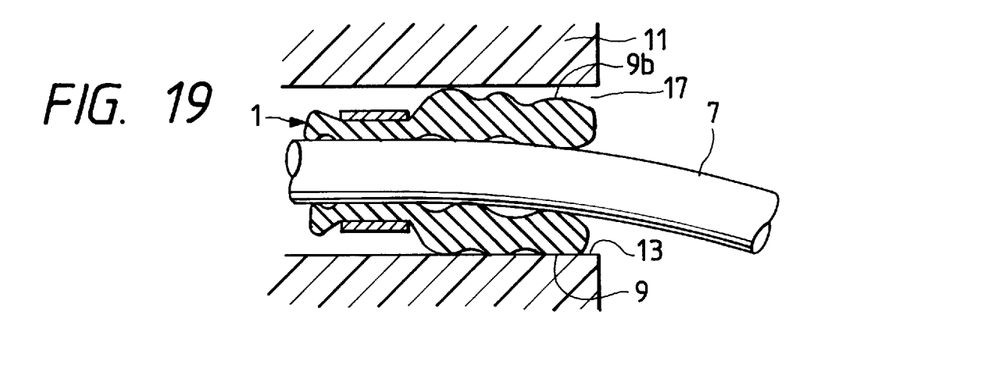
FIG. 19 is a section view of the conventional waterproof rubber tap, showing a gap formed between the waterproof rubber tap and electric wire insertion hole when the waterproof rubber tap is bent; an FIG. 20 is a section view of the conventional waterproof rubber tap, showing a gap formed between the waterproof rubber tap and electric wire when the waterproof rubber tap is bent.

However, in the conventional waterproof rubber tap 1, as shown in FIG. 19, if the electric wire 7 is bent in the neighborhood of the entrance of the electric wire insertion passage 13, then the annular projections 9a on the bending direction side of the waterproof rubber tap 1 are pressed by the electric wire 7 and thereby contact closely with the inner wall of the electric wire insertion passage 13, while the annular projections 9b on the opposite side to the bending direction, are separated from the inner wall of the electric wire insertion passage 13, thereby producing a gap 17. Since the outside diameters of the annular projections 9 are all the same, the gap becomes greatest in the portion of the annular projection 9b at the distal end of the waterproof rubber tap 1 at which the greatest force is applied from the electric wire 7. If the gap 17 is produced, then the electric wire 7 and connector housing 11 are vibrated, that is, the production of the gap 17 and the vibration of the electric wire 7 and connector housing 11 combined, cause a danger that water can penetrate the interior of the connector.

Figure 20:
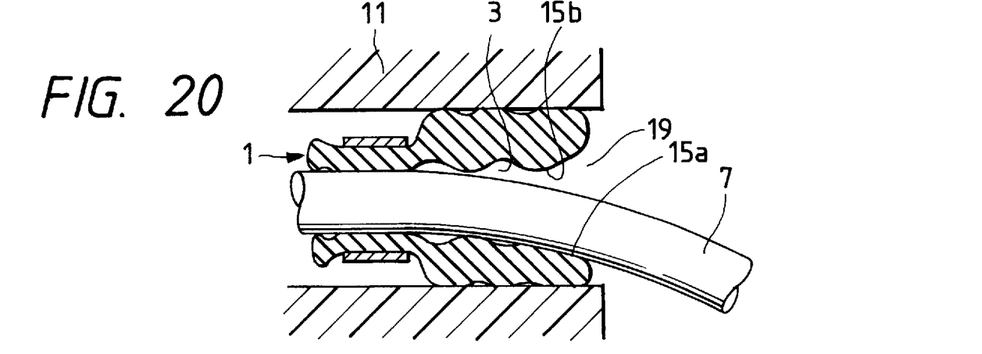

Also, as shown in FIG. 20, if the electric wire 7 is bent, then there can be produced a gap in the electric wire insertion hole 3 as well. That is, the bulge portions 15a on the bending direction side are pressed and are thus compressed by the electric wire 7, whereas the bulge portions 15b on the opposite side to the bending direction are separated from the electric wire 7, thereby producing a gap 19 between the bulge portions 15b and electric wire 7. Because the inside diameters of the bulge portions 15 are all the same, the gap 19 also becomes greatest in the portion of the bulge portion 15b at the distal end of the waterproof rubber tap 1 where the electric wire 7 is bent most. If the gap 19 is produced, similarly to the above case, then there is produced a danger that water can penetrate the interior of the connector.

SUMMARY OF THE INVENTION

The present invention aims at eliminating the abovementioned drawbacks found in the conventional waterproof rubber tap. Accordingly, it is an object of the invention to provide a waterproof rubber tap which, even when an electric wire is bent, prevents production of a gap between the electric wire and connector housing to thereby prevent penetration of water into the connector and improve the reliability of the waterproof rubber tap.

Also, it is another object of the invention to provide a waterproof connector which uses the above waterproof rubber tap to prevent water penetration, in a simple manner.

In attaining the above object, according to the invention, there is provided a cylindrical-shaped waterproof rubber tap of a type that, when an electric wire is inserted through an electric insertion hole formed in the inner peripheral side thereof and it is then inserted together with the inserted electric wire into an electric wire insertion passage formed in a main body of a connector, then it can prevent water from entering between the electric wire and the electric wire insertion passage. The waterproof rubber tap includes, on the outer periphery of the end portion on the opposite side to the insertion side of the waterproof rubber tap, a tapered sealing annular projecting portion, which has an outside diameter increasing toward the opposite direction to the insertion direction of the waterproof rubber tap and also which includes an end portion having an outside diameter greater than the inside diameter of the electric wire insertion passage.

The waterproof rubber tap may be structured such that a flange-shaped head portion is closely contactable with the rear end face of the main body of the connector including the electric insertion passage therein and is provided so as to form a continuation with the end portion of the sealing annular projecting portion, and, in the flange-shaped head portion, there is formed a tapered hole having one end connected with the electric wire insertion hole, with the other end thereof having an increased diameter.

Also, the waterproof rubber tap may be preferably structured such that there are formed in the flange-shaped head portion a plurality of water discharge passages which respectively extend from the tapered hole through the outer periphery of the waterproof rubber tap.

Further, the waterproof rubber tap may be structured such that the hole edge portion thereof is formed in a corner shape and an annular bulge portion having an inside diameter smaller than the outside diameter of the electric wire is provided in the end portion of the electric insertion hole formed on the opposite side to the insertion side of the waterproof rubber tap.

Moreover, the waterproof rubber tap may be structured such that a cylindrical portion having an outside diameter equal to the outside diameter of the end portion of the sealing annular projecting portion is so provided as to continue with the end portion of the sealing annular projecting portion.

A waterproof connector according to the invention is characterized in that the waterproof rubber tap having the above-mentioned structure is mounted in a connector housing thereof.

In the waterproof rubber tap, including the tapered annular projecting portion for sealing, if the electric wire is bent, then the annular projecting portion on the opposite side to the bent direction of the wire is caused to shift in a direction to part away from the inner wall of the electric insertion passage and the annular projecting portion which has been compressed flat is restored to its original shape or tapered shape, to thereby keep its close contact with the inner wall of the electric wire insertion passage.

In the waterproof rubber tap including the flange-shaped head portion so formed as to continue with the end portion of the sealing annular projecting portion, if it is inserted into the electric insertion passage, then the flange-shaped head portion is abutted against the rear end face of the connector main body and thus the flange-shaped head portion acts as a stopper to thereby control the insertion of the waterproof rubber tap at a given position.

In the waterproof rubber tap including the water drain passages in the flange-shaped head portion, even when the tapered hole is turned to face upwardly, water drops fallen into the tapered hole can be drained externally through the water drain passages.

In the waterproof rubber tap in which the hole edge portion is formed in a corner shape, if the electric wire is bent, then the annular bulge portion positioned on the opposite side to the bent direction of the wire is caused to shift in the wire bent direction and the compressed annular bulge portion is restored to its original shape to thereby be able to keep its close contact with the hole edge portion of the electric wire. Also, the corner portion of the annular bulge portion is contacted closely with the outer periphery of the electric wire from their intersecting direction to thereby prevent a recessed portion, in which water collects, from being generated in the corner portion of the close contact portion.

In the waterproof rubber tap, including the cylindrical portion which is provided so as to continue with the end portion of the sealing annular projecting portion, the tapered sealing annular projecting portion passes through the rear end face of the connector main body and, if the waterproof rubber tap is inserted further deeply, then the extra portion of the cylindrical portion is projected out from the rear end face of the connector main body, thereby preventing a recessed portion, which provides a main factor for collection of water, from being generated in the opening portion of the connector main body.

BRIEF DESCRIPTION OF THE DRAWINGS

FIGS. 14 (a) and (b) are enlarged views of the main portions of the waterproof rubber tap according to the fifth embodiment;

DETAILED DESCRIPTION OF THE PREFERRED EMBODIMENTS

Now, description will be given below in detail of the preferred embodiments of a waterproof rubber tap according to the invention with reference to the accompanying drawings.

Figure 1:
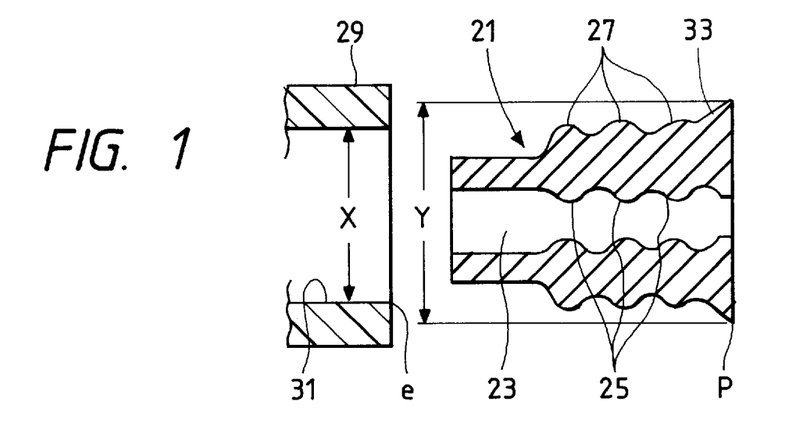
FIG. 1 is a section view of a first embodiment of a waterproof rubber tap according to the invention.

FIG. 1 is a section view of a first embodiment of a waterproof rubber tap according to the invention.

A cylindrical waterproof rubber tap 21 including an electric insertion hole 23 and a plurality of annular bulge portions (which will be hereinafter referred to as lips) 25 is formed on the inner wall of the electric insertion hole 23, while the inside diameter of the lip 25 is slightly smaller than the outside diameter of an electric wire. The waterproof rubber tap 21 also includes on the outer periphery thereof a plurality of sealing annular projecting portions (which will be hereinafter referred to as lips similarly to the above-mentioned bulge portions) 27, while the outside diameter of the lip 27 is slightly larger than the inside diameter X of an electric insertion passage 31 formed in a connector housing 29.

The waterproof rubber tap 21 further includes, on the outer periphery of the end portion thereof located on the opposite side to the insertion side of the tap 21 into the electric wire insertion passage 31, a tapered lip 33 the outside diameter of which is so set as to increase in a direction opposite to the tap insertion direction, until it reaches the outside diameter Y of the tapered end portion p of the lip 33. When the waterproof rubber tap 21 is mounted to the connector housing 29, it is inserted into a position at which the tapered end portion p of the lip 33 is identical with an opening edge portion e formed on the inner periphery of the electric wire insertion passage 31. That is, the lip 33 is compressed and pressed into the electric wire insertion passage 31 until the outer diameter Y of the tapered end portion p is equal to the inside diameter X of the electric wire insertion passage 31.

As the main body of the connector, besides the above-mentioned connector housing, there can also be used an electric wire hold member such as a grommet, which will be mounted into a mounting hole formed in a panel or the like with an electric wire inserted therethrough to thereby hold and protect the electric wire. However, in the respective embodiments which will be described hereinafter, the description will be given under the assumption that the connector main body is a connector housing.

Figure 2:
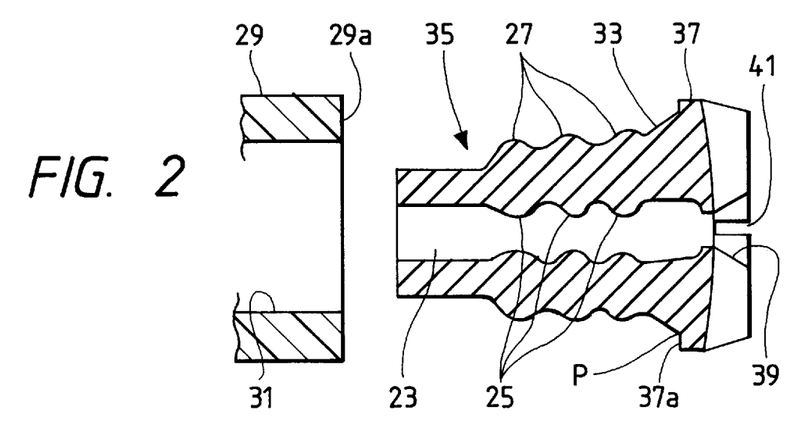
FIG. 2 is a section view of a second embodiment of a waterproof rubber tap according to the invention.
Figure 3:
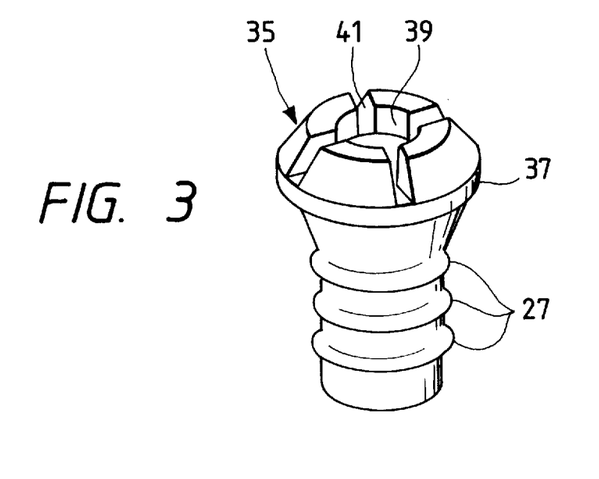
FIG. 3 is a perspective view of the second embodiment of a waterproof rubber tap according to the invention.

Next, a description will be given below of a modified version or a second embodiment of a waterproof rubber tap including a lip 33 according to the invention with reference to FIGS. 2 and 3. In particular, FIG. 2 is a section view of the second embodiment of a waterproof rubber tap according to the invention, and FIG. 3 is a perspective view of the second embodiment of a waterproof rubber tap according to the invention.

A waterproof rubber tap 35 according to the present or second embodiment includes lips 25, 27 and 33 which are structured similarly to the above-mentioned waterproof rubber tap 21. On the other hand, the waterproof rubber tap 35 includes, on the rear end face thereof on the opposite side to the insertion side thereof, a flange-shaped head portion 37 which can be closely contacted with the rear end face 29a of the connector housing 29, while the close contact surface 37a of the flange-shaped head portion 37 for close contact with the connector housing, is formed to be continuous with the tapered end portion p of the lip 33. That is, with the tapered end portion p pressed into the electric wire insertion passage 31, the close contact surface 37a can be closely contacted with the rear end face 29a of the connector housing 29.

In the flange-shaped head portion 37, there is formed a tapered hole 39 which is in communication with the electric wire insertion hole 23 to facilitate the insertion of the electric wire. The tapered hole 39 includes a hole edge which is opened to the rear end face of the waterproof rubber tap 35 in such a manner that it is widened outwardly. The flange-shaped head portion 38 also includes on the rear end face four crosswise or radially formed water drain grooves 41 (see FIG. 3) which are so disposed as to extend from the tapered hole 39 along the rear end face 29a of the connector housing 29 through the outer peripheral side thereof. The water drain grooves 41 are so formed as to serve as water drain passages.

Now, a description will be given below of the operation of the thus structured waterproof rubber taps 21 and 35 with reference to FIGS. 4 and 5. In particular, FIG. 4 is a section view of the waterproof rubber tap which is mounted to the connector housing, and FIG. 5 is a section view of the waterproof rubber tap, showing a state thereof in which the electric wire is bent.

Here, since the structure of the tapered lip 33 in the waterproof rubber tap 21 is the same as that of the tapered lip 33 in the waterproof rubber tap 35 and thus the operations thereof are also identical with each other, a description will be given of only the operation of the waterproof rubber tap 35 and the description of the operation of the tap 21 is omitted here.

Figure 4:
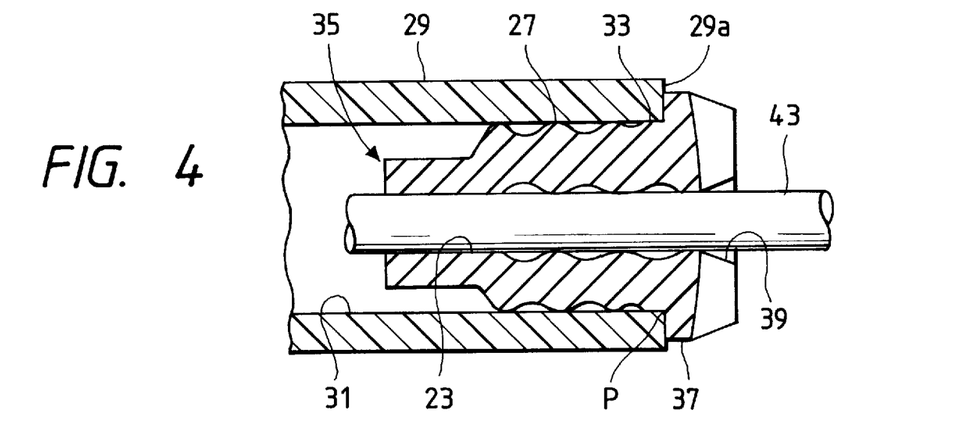
FIG. 4 is a section view of a waterproof rubber tap mounted to a connector housing.

As shown in FIG. 4, if the waterproof rubber tap 35 (or waterproof rubber tap 21) with an electric wire 43 inserted through the electric wire insertion hole 23 on the inner peripheral side of the waterproof rubber top 35 is inserted into the electric wire insertion passage 31 of the connector housing 29, then the lips 27 are closely contacted with the inner wall of the electric wire insertion passage 31. On the other hand, the tapered end portion p of the lip 33 is inserted into the electric wire insertion passage 31 and the tapered shape thereof is compressed to a flat state so that the tapered end portion p can be closely contacted with the inner wall of the electric wire insertion passage 31.

Figure 5:
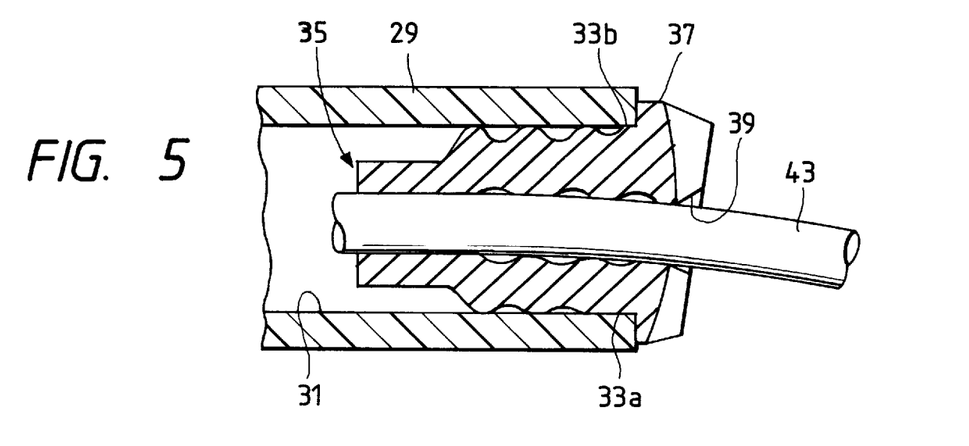
FIG. 5 is a section view of a waterproof rubber tap, showing a state thereof when an electric wire is bent.

In this state, as shown in FIG. 5, if the electric wire 43 is bent, then the lip portion 33a of the lip 33 on the bent direction side is pressed by the electric wire 43 so that the lip portion 33a is further closely contacted with the inner wall of the electric wire insertion passage 31. On the other hand, the lip portion 33b of the lip 33 on the opposite side to the bent direction side is shifted in a direction to part away from the inner wall of the electric insertion passage 31 and the close contact state thereof is relieved. If the close contact state is relieved, then the lip portion 33b, which has been compressed and flattened, is restored to its original or tapered shape by an amount equivalent to the amount of shift, thereby being able to keep its close contact with the inner wall of the electric wire insertion passage 31. In other words, the portion, which would provide the gap 17 (see FIG. 19) according to the conventional waterproof rubber tap, can still be closely contacted with the inner wall of the passage 31 due to the restored tapered lip portion 33b. That is, the lip 33 is previously formed in a tapered shape that can seal a gap which would be possibly produced in the inner wall of the electric wire insertion passage 31 if the electric wire 43 is bent. Therefore, even when the electric wire 43 is bent, the lip 33 is always restored to its original tapered shape to thereby prevent any gap from being generated between the inner wall of the electric wire insertion passage 31 and the lip 33.

Also, referring to an action inherent in the waterproof rubber tap 35 including the flange-shaped head portion 37, when the waterproof rubber tap 35 is inserted into the electric wire insertion passage 31, then the flange-shaped head portion 37 is butted against the rear end face 29a of the connector housing 29 to act as a stopper, so that the insertion of the waterproof rubber tap 35 can be restricted. This makes it possible to position the tapered end portion p of the lip 33 positively at a given position in the electric wire insertion passage 31. Further, according to the waterproof rubber tap 35, even if the tapered hole 39 is turned to face upwardly, water drops fallen there can be discharged externally through any of the water drain grooves 41 (see FIG. 3). This prevents water from collecting in the tapered hole 39, which in turn makes it difficult for water to penetrate the interior of the electric wire insertion hole 23.

Figure 6:
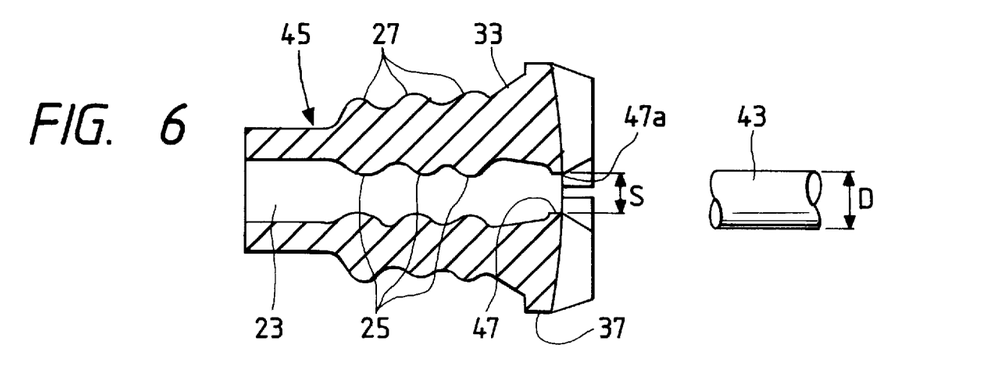
FIG. 6 is a section view of a third embodiment of a waterproof rubber tap according to the invention.

Now, FIG. 6 is a section view of a third embodiment of a waterproof rubber tap according to the invention.

A waterproof rubber tap 45 according to the third embodiment includes lips 25, lips 27, a lip 33, and a flange-shaped head portion 37 which are respectively structured similarly to those used in the above-mentioned waterproof rubber tap 35. On the other hand, in the end portion of the electric wire insertion hole 23 on the opposite side to the insertion side of the waterproof rubber tap 45, there is formed a lip 47 which has an inside diameter S smaller than the outside diameter of the electric wire 43 so that the lip 47 portion of the waterproof rubber tap 45 can be contacted closely with the electric wire 43. Also, the lip 47 is structured in such a manner that the hole edge portion thereof provides a corner (edge) portion 47a. In other words, since the corner portion 47a is closely contacted with the electric wire 43, the lip 47 can be closely contacted with the outer periphery of the electric wire 43 from their intersecting direction. For this reason, no recessed portion can be generated in the corner portion of the closely contacted portion between the lip 47 and the electric wire 43.

Also, the inner peripheral surface of the lip 47, when it is viewed from its section view shown in FIG. 6, is formed of a flat surface parallel to the outer periphery of the electric wire (see FIG. 6), or a tapered surface (not shown) the diameter of which is enlarged toward the insertion direction of the waterproof rubber tap 45.

Now, a description will be given below of the operation of the thus structured waterproof rubber tap 45 with reference to FIGS. 7 and 8. In particular, FIG. 7 is a section view of the waterproof rubber tap according to the third embodiment mounted into a connector housing, and FIG. 8 is a section view of the waterproof rubber tap according to the third embodiment, showing the state thereof when an electric wire is bent.

Figure 7:
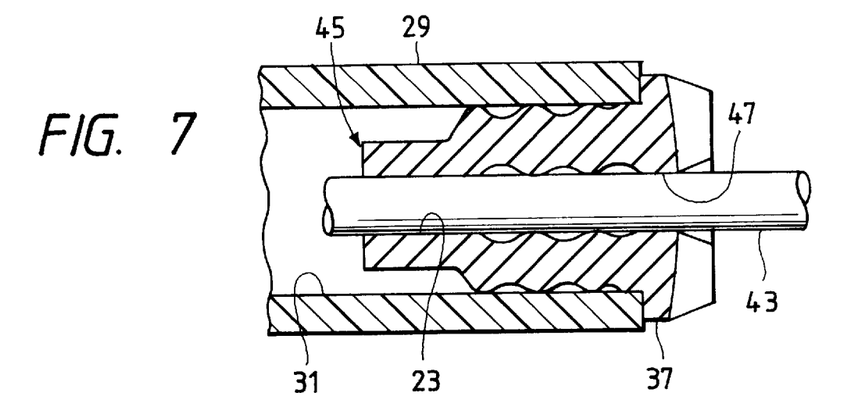
FIG. 7 is a section view of a waterproof rubber tap according to the third embodiment of the invention mounted to a connector housing.

As shown in FIG. 7, if the waterproof rubber tap 45 with the electric wire 43 inserted therethrough is inserted into the electric wire insertion passage 31, then the electric wire 43 inserted through the electric wire insertion hole 23 of the waterproof rubber tap 45 can be contacted closely with the lip 47.

Figure 8:
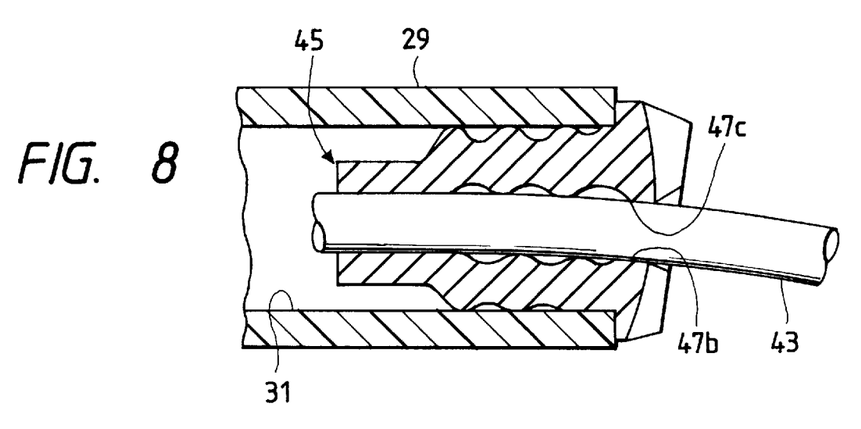
FIG. 8 is a section view of the waterproof rubber tap according to the third embodiment, showing a state thereof when an electric wire is bent.

In this state, as shown in FIG. 8, if the electric wire 43 is bent, then the lip portion 47b of the lip 47 on the bent direction side is pressed by the electric wire 43 and is thus compressed. On the other hand, the lip portion 47c of the lip 47 on the opposite side to the bent direction side is shifted toward the bent direction of the electric wire 43 to thereby relieve the contact condition. When the contact condition is relieved, then the compressed lip portion 47c of the lip 47 is restored to its original shape by an amount equivalent to the quantity of shift of the lip portion 47c, to thereby be able to keep the close contact condition with the electric wire 43. That is, the portion that would provide a gap 19 (see FIG. 20) in the conventional waterproof rubber tap, according to the present embodiment, can maintain its close contact condition thanks to the restored lip portion 47c. For this reason, even when the electric wire 43 is bent, the lip 47 is always restored to its original shape to cover the would-be gap, thereby preventing a gap from being generated between the electric wire 43 and lip 47. In this case, if the inner peripheral surface of the lip 47 is a tapered surface increasing in diameter toward the insertion direction of the waterproof rubber tap 45, then the leading end portion of the lip 47 is restored to its original state in a circle having a triangular section approximate to the gap, thereby being able to provide a better close contact condition.

Figure 9:
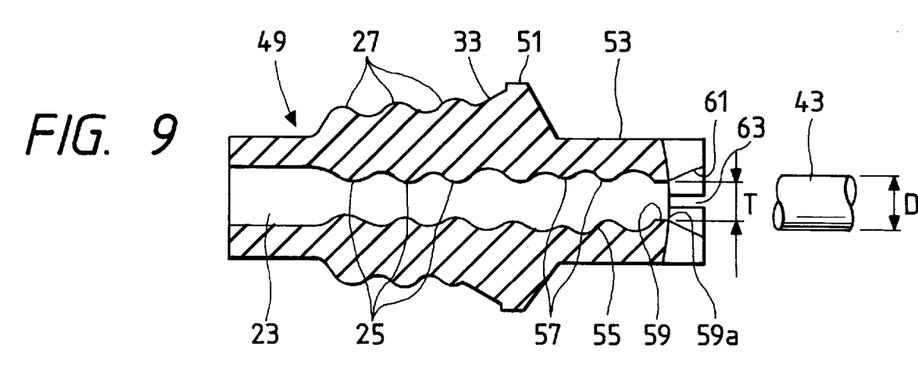
FIG. 9 is a section view of a fourth embodiment of a waterproof rubber tap according to the invention.
Figure 10:
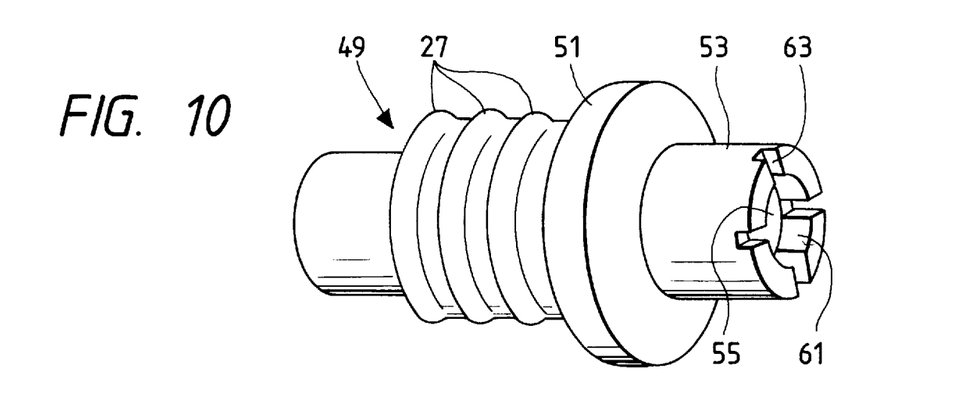
FIG. 10 is a perspective view of the fourth embodiment of a waterproof rubber tap according to the invention.

Now, FIG. 9 is a section view of a fourth embodiment of a waterproof rubber tap according to the invention, while FIG. 10 is a perspective view of the fourth embodiment of a waterproof rubber tap according to the invention.

In the waterproof rubber tap 49 according to the fourth embodiment, lips 25, lips 27, and a lip 33 are structured similarly to those used in the above-mentioned waterproof rubber tap 45. On the other hand, on the rear portion side of the waterproof rubber tap 49, there is formed a flange-shaped head portion 51 which can be closely contacted with the rear end face 29a (see FIG. 4) of the connector housing 29. A cylindrical boot 53 is formed in such a manner that it is continuous with the rear end face of the flange-shaped head portion 51, and the boot 53 includes a through hole 55 which is in communication with the electric wire insertion hole 23. Annular lips 57 are formed on the inner wall of the through hole 55 in such a manner that the lips 57 can be closely contacted with the outer periphery of the electric wire 43.

In the end portion of the through hole 55 on the opposite side to the insertion side of the waterproof rubber tap 49, there is formed an annular lip 59 which has an inside diameter T smaller than the outside diameter D of the electric wire 43 so that the lip 59 can be closely contacted with the outer periphery of the electric wire 43. Also, the lip 59 is formed in such a manner that the hole edge portion thereof provides a corner portion 59a. For this reason, if the corner portion 59a is closely contacted, then the lip 59 can be closely contacted with the outer periphery of the electric wire 43 from their intersecting direction.

Further, on the rear end face of the boot 53, there is formed a tapered portion which is in communication with the through hole 55. The tapered portion 61 includes on the rear end face thereof an open hole edge portion the diameter of which increases outwardly. On the rear end face of the boot 53, there are formed four cross-shaped water drain grooves 63 (see FIG. 10) which respectively extend radially from the tapered portion 61 externally of the boot 53. The water drain grooves 63 serve as water drain passages, respectively.

Figure 11:
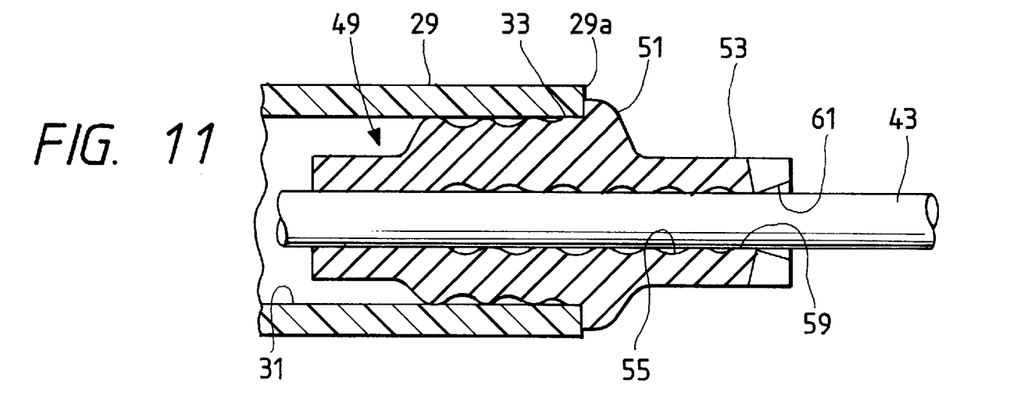
FIG. 11 is a section view of the waterproof rubber tap according to the fourth embodiment of the invention mounted to a connector housing.

Next, a description will be given below of the operation of the thus structured waterproof rubber tap 49 with reference to FIGS. 11 and 12. In particular, FIG. 11 is a section view of the fourth embodiment of a waterproof rubber tap according to the invention, showing a state thereof when it is mounted to a connector housing, and FIG. 12 is a section view of the fourth embodiment of a waterproof rubber tap according to the invention, showing a state thereof when the electric wire is bent.

When the waterproof rubber tap 49 is inserted into the electric wire insertion passage 31, then the flange-shaped head portion 51 is butted against the rear end face 29a of the connector housing 29 to serve as a stopper to thereby restrict the insertion of the waterproof rubber tap 49, so that the lip 33 can be positioned at a given position. In this state, the electric wire 43 inserted through the through hole 55 is closely contacted with the lip 59.

Figure 12:
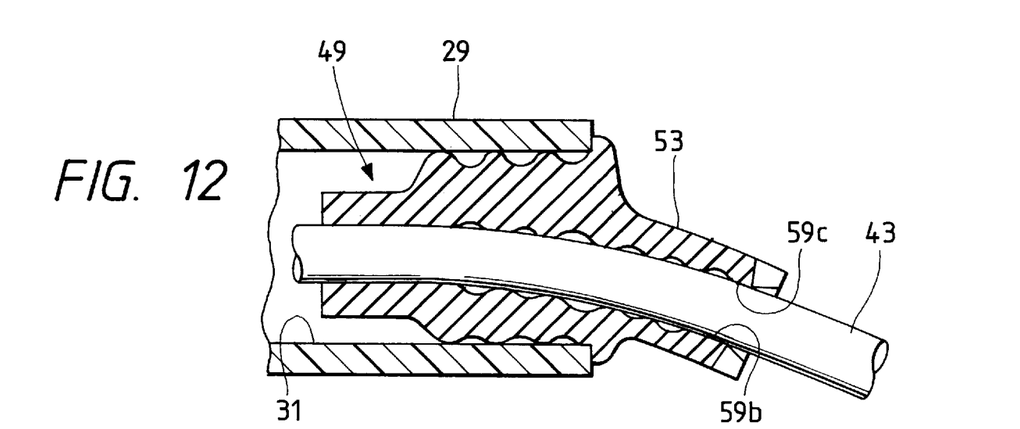
FIG. 12 is a section view of the waterproof rubber tap according to the fourth embodiment, showing a state thereof when an electric wire is bent.

As shown in FIG. 12, if the electric wire 43 is bent, then the boot 53 is bent and the lip portion 59b on the bent direction side is pressed by the electric wire 43 into a compressed state. On the other hand, the lip portion 59c on the opposite side to the bent direction side is shifted toward the bent direction of the electric wire 43 to thereby relieve the close contact condition thereof. If the close contact condition is relieved, then the compressed lip portion 59c is restored to its original state by an amount corresponding to the quantity of shift to thereby be able to keep its close contact condition with the electric wire 43. Therefore, similarly to the lip 47 in the waterproof rubber tap 45, the portion of the lip 59 that would provide a gap in the conventional waterproof rubber tap can be always kept in close contact with the electric wire 43 by means of the restored lip 59.

Also, on the rear end face of the boot 53, even if the tapered portion 61 is turned upward, the water drops that fall on there can be drained through any one of the water drain grooves 63. This prevents water from collecting in the tapered portion 61, which in turn makes it difficult for water to get into the through hole 55.

Figure 13:
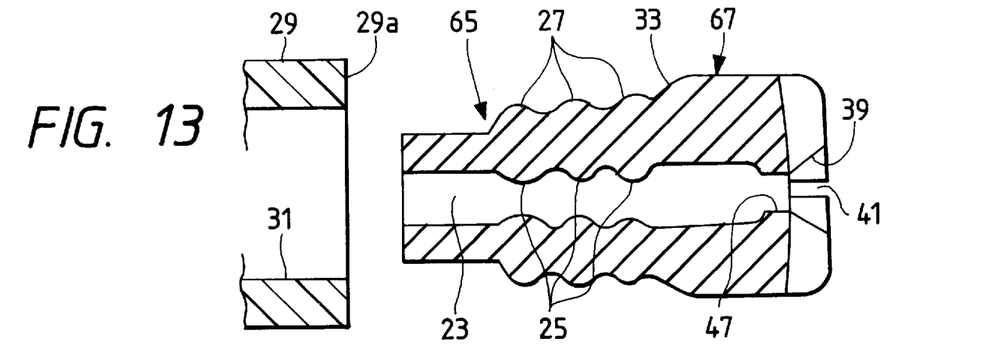
FIG. 13 is a section view of a fifth embodiment of a waterproof rubber tap according to the invention.
Figure 14A:
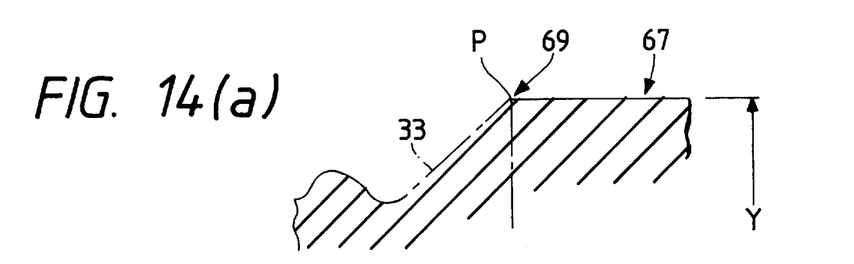
Figure 14B:
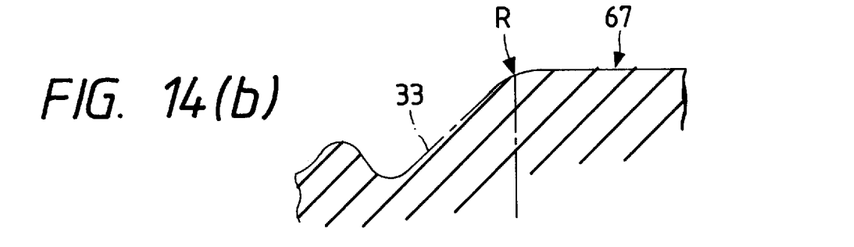
Figure 15:
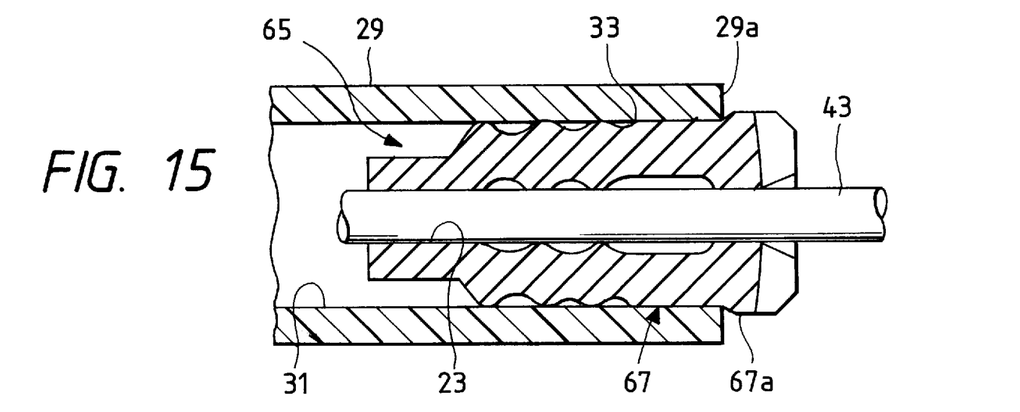
FIG. 15 is a section view of the waterproof rubber tap according to the fifth embodiment mounted to a connector housing.

Now, FIG. 13 is a section view of a fifth embodiment of a waterproof rubber tap according to the invention, FIG. 14 is an enlarged view of the main portions of a waterproof rubber tap according to the fifth embodiment of the invention, and FIG. 15 is a section view of the waterproof rubber tap according to the fifth embodiment of the invention, showing a state thereof when it is mounted to a connector housing.

In the waterproof rubber tap 65 according to the fifth embodiment, lips 25, lips 27 and a lip 33 are similar in structure to those included in the above-mentioned waterproof rubber tap 21. On the other hand, in the rear portion side of the waterproof rubber tap 65, there is formed a cylindrical portion 67 which, as shown in FIG. 14 (*a*), is arranged so as to continue with the tapered end portion p of the lip 33. That is, the outside diameter of the cylindrical portion 67 is equal to the outside diameter Y of the tapered end portion p. In a case where watertightness is most important, a boundary portion exists between the tapered end portion p and cylindrical portion 67, and has an edge (corner) portion 69 as shown in FIG. 14 (*a*). On the other hand, if insertability is regarded as most important, then the edge portion 69 is removed but a round portion R is formed in the boundary portion as shown in FIG. 14 (*b*). Further, in a structure in which the insertability is regarded as most important, not only the round portion R is formed but also, although not shown, of course, the edge portion 69 may be chamfered by means of an inclined surface.

In addition, in the electric wire insertion hole 23 of the cylindrical portion 67, similarly to the above embodiment, there is provided a lip 47 and, on the rear end face of the cylindrical portion 67, there are similarly formed a tapered hole 39 and water drain grooves 41 which are respectively in communication with the electric wire insertion hole 23.

In the thus structured waterproof rubber tap 65, the lip 33, lip 47 and water drain grooves 41 act similarly to the above-mentioned waterproof rubber taps 35 and 45.

On the other hand, the waterproof rubber tap 65 can act as follows due to formation of the cylindrical portion 67. That is, due to the continuous provision of the cylindrical portion 67, even when the lip 33 is passed through the rear end face 29*a* of the connector housing 29 and is further inserted deeply into the electric wire insertion passage 31, as shown in FIG. 15, the extra portion 67*a* of the cylindrical portion 67 is projected out from the rear end face 29*a*. In other words, in a structure in which only the lip 33 is formed, if the lip 33 is inserted through the rear end face 29*a*, then there is produced a recessed portion in the opening portion of the electric wire insertion passage 31. On the other hand, in a structure in which the cylindrical portion 67 is so formed as to adjoin continuously the lip 33, the extra portion 67*a* of the cylindrical portion 67 is always projected out from rear end face 29*a*, whereby the recessed portion which provides a main factor for collection of water can be prevented from being produced in the opening portion of the electric wire insertion passage 31.

Also, due to provision of the lip 33, even when the electric wire 43 is bent, similarly to the previously described case, the tapered shape is always restored to thereby prevent any gap from being generated between the inner wall of the electric wire insertion passage 31 and the lip 33. In addition to this, if the cylindrical portion 67 having an outside diameter equal to the outside diameter Y of the tapered end portion p of the lip 33 is inserted into the electric wire insertion passage 31, then the outer side surface of the cylindrical portion 67 can be closely contacted with the inner peripheral surface of the electric wire insertion passage 31, so that, of course, the watertightness of the waterproof rubber tap can be improved further.

According, to the waterproof rubber tap 65 including the round portion R formed between the tapered end portion p and the cylindrical portion 67, not only a high amount of watertightness can be secured due to the lip 33 but also the insertability of the waterproof rubber tap 65 into the electric wire insertion passage 31 can be further improved.

Figure 16:
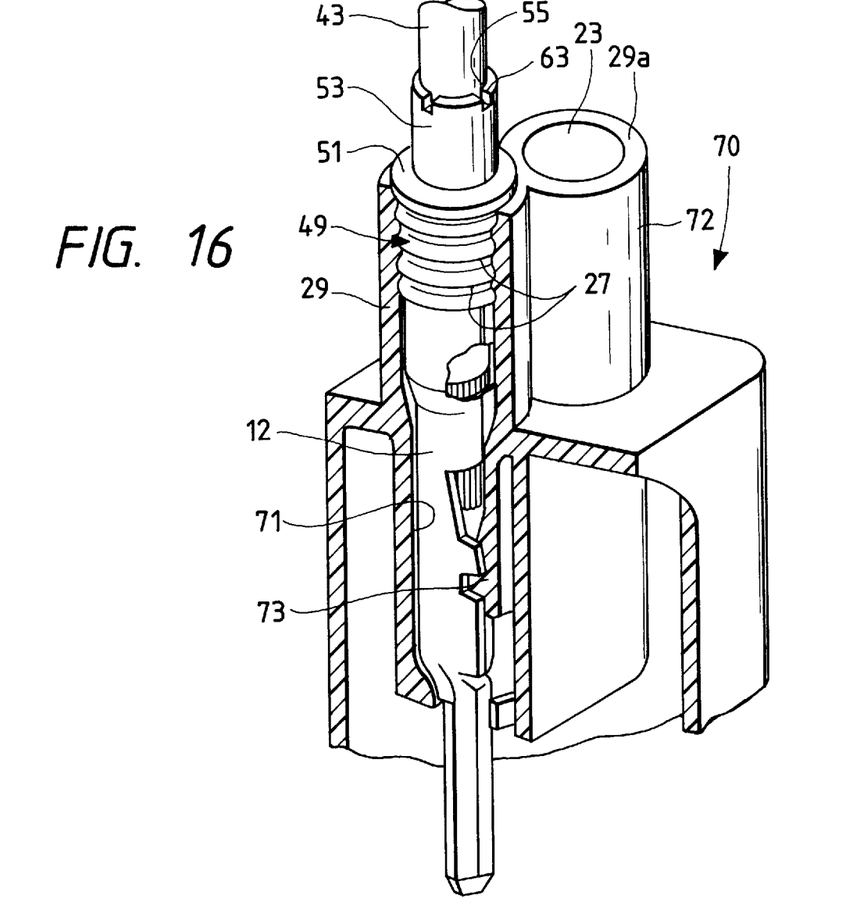
FIG. 16 is a partially cutaway perspective view of a waterproof rubber tap according to the invention.

Next, a description will be given below of a preferred embodiment of a waterproof connector according to the invention with reference to FIG. 16. The above-mentioned respective waterproof rubber taps can be applied to this waterproof connector. In the present embodiment, a description will be given of a case in which the waterproof rubber tap shown in FIG. 10 is applied to the present waterproof connector.

The waterproof connector 70 includes the waterproof rubber tap 49 and, in particular, the waterproof connector 70 can be assembled by inserting the waterproof rubber tap 49 into the electric wire insertion passages 31 respectively in communication with the terminal storage chambers 71 formed in the connector housing 29.

That is, the connector housing 29 is structured such that a hollow cylindrical portion 72 thereof, in which the electric wire insertion passages 31 respectively in communication with the terminal storage chambers 71 are formed, adjoins continuously the rear portion of the housing. By pressure inserting the above-mentioned waterproof rubber tap 49 from the electric wire insertion passages 31 to thereby insert the terminals 12 into the terminal storage chambers 71, water can be prevented from entering between the electric wire 43 inserted through the electric wire insertion hole 23 of the waterproof rubber tap 49 and the electric wire insertion hole 23, as well as between the waterproof rubber tap 49 and the electric wire insertion passages 31, so that the connector can be made waterproof.

To mount the waterproof rubber tap 49 into the connector, the electric wire 43 is inserted through the through hole 55 and electric wire insertion hole 23 from the side of the through hole 55 of the boot 53 of the waterproof rubber tap 49, and, in a state in which the electric wire 43 is slightly projected out from the electric wire insertion hole 23, the conductor 43*a* of the wire 43 is exposed and is connected to the terminal 12. That is, while the waterproof rubber tap 49 and electric wire 43 are being kept in the above-mentioned state, the terminal 12 is positioned accurately on the small-diameter cylindrical portion of the waterproof rubber tap 49 on the opposite side to the boot side, and then the waterproof rubber tap 49 and electric wire 43 are fastened together into a unified whole.

Also, in each of the terminal storage chambers 71, there is provided a flexible securing piece 73 which prevents the rearward removal of the terminal 12. Thus, when the terminal 12 is inserted into the terminal storage chamber 71, then the flexible securing piece 73 is secured to the terminal 12 to position the terminal 12 at a given position. In this state, the waterproof rubber tap 49 is stretched to a slight degree and thus the flange-shaped head portion 51 thereof is butted against the rear end face 29a of the hollow cylindrical portion 72. This keeps the close contact condition between the rear end face 29a and the flange-shaped head portion 51 of the waterproof connector 70, so that entrance of water into the connector housing can be further prevented. The action of the waterproof rubber tap 49 is just as described above and, therefore, the waterproof connector incorporating the waterproof rubber tap 49 can be made waterproof in an improved manner.

As has been described in detail heretofore, in a waterproof rubber tap including a tapered sealing annular projecting portion according to the invention, the gap that would be generated between the electric wire and the electric wire insertion passage can be always closely contacted with the annular projection portion which is restored in a tapered shape, thereby preventing any gap from being generated. As a result of this, water entrance can be prevented positively and the reliability of the waterproof tap can be enhanced greatly.

In a waterproof rubber tap including a continuously formed flange-shaped head portion, the flange-shaped head portion acts as a stopper to thereby be able to position easily the end portion of the annular projecting portion, at a given position within the electric wire insertion passage.

In a waterproof rubber tap including a plurality of water drain passages, water is prevented from collecting in the tapered hole, which in turn prevents the water from getting into the electric insertion hole.

In a waterproof rubber tap including a hole edge portion which is formed in an edge (corner) portion, even when the electric wire is bent, the annular bulge portion is restored into the gap, thereby preventing any gap from being generated between the electric wire and electric wire insertion hole. Also, the corner portion is closely contacted with the outer periphery of the electric wire from their intersecting direction, which makes it difficult for water to collect in the corner portion of the close contact portion.

In a waterproof rubber tap including a cylindrical portion which is formed continuously with the end portion of a sealing annular projecting portion, even if the tapered sealing annular projecting portion passes through the rear end face of the main body of the housing, the extra portion of the cylindrical portion is always projected out from the rear end face, which prevents a recessed portion from being generated in the opening portion of the housing main body, the recessed portion providing a main factor for the collecting water. As a result of this, the watertightness of the waterproof rubber tap can be improved.

Also, by use of the above-mentioned respective waterproof rubber taps, the watertightness of the waterproof connector can be achieved easily.

What is claimed is:

1. A waterproof rubber tap comprising:
    a unitary main body substantially cylindrical in shape, having an insertion end and a projection end, said insertion end being receivable in an electric wire passage formed in a connector housing, and wherein said unitary main body forms a watertight seal with said connector housing when mounted thereto,
    said unitary main body having a longitudinally extending electric wire insertion hole substantially cylindrical in shape passing through said unitary main body, wherein an electric wire is inserted into the electric wire insertion hole at said protection end, said electric wire forming a watertight seal within said unitary main body; and
    a tapered sealing annular projecting portion formed on an outer periphery of an end portion of said projection end of said unitary main body, said projecting portion having an outside diameter increasing toward said projection end and an outside diameter of an end portion of said projecting portion being greater than an inside diameter of said electric wire passage.

2. A waterproof rubber tap as claimed in claim 1 further comprising:
    a flange-shaped head portion formed continuously with the end portion of said sealing annular projecting portion in such a manner that said flange-shaped head portion is closely contacted with a rear end face of said connector housing when mounted, and the flange-shaped head portion including a tapered hole having one end connected continuously with said electric wire insertion hole and the other end thereof having a diameter greater than that of the one end thereof.

3. A waterproof rubber tap as claimed in claim 2, wherein said flange-shaped head portion includes a plurality of water drain passages respectively extending from said tapered hole through the outer periphery of said end portion of said projection end thereof.

4. A waterproof rubber tap as claimed in claim 2, wherein said tapered annular projecting portion is deformed in an inserted position within said connector housing when mounted thereto, and closely contacts an inner wall of said electric wire passage of said connector housing when mounted thereto, to form said watertight seal.

5. A waterproof rubber tap as claimed in claim 1, further comprising:
    a cylindrical portion continuously provided with said end portion of said sealing annular projecting portion, said cylindrical portion having an outside diameter substantially equal to the outside diameter of the end portion of said sealing annular projecting portion.

6. A waterproof rubber tap as claimed in claim 5, wherein, said cylindrical portion includes a tapered hole having one end connected continuously with said electric wire insertion hole and the other end thereof having a diameter larger than that of the one end, and a plurality of water drain passages respectively extending from said tapered hole through an outer periphery of said cylindrical portion.

7. A waterproof rubber tap as claimed in claim 5, wherein a round portion is formed in a boundary portion between said end portion of said sealing annular projecting portion and the cylindrical portion.

8. A waterproof rubber tap as claimed in claim 1, further comprising:
    an annular bulge portion formed in an end portion of said electric wire insertion hole at said projection end of said unitary main body, the annular bulge portion including a hole edge portion formed in a corner shape and having an inside diameter smaller than an outside diameter of said electric wire.

9. A waterproof connector comprising:
    a connector housing body having a plurality of electric wire passages formed in the connector housing body; and
    a waterproof rubber tap including:
        a unitary main body substantially cylindrical in share, having an insertion end and a projection end, said insertion end being receivable into one of the plurality of electric wire passages;

said unitary main body having a longitudinally extending electric wire insertion hole substantially cylindrical in shape passing through said unitary main body, wherein an electric wire is inserted into the electric wire insertion hole at said protection end, said electric wire forming a watertight seal within said unitary main body; and a tapered sealing annular projecting portion formed on an outer periphery of an end portion of said projection end of said unitary main body, said projecting portion having an outside diameter increasing toward said protection end and an outside diameter of an end portion of said projecting portion being greater than an inside diameter of the one of said plurality of electric wire insertion passages.

10. A waterproof rubber tap comprising:

a main body shaped in cylindrical form, for insertion into an electric wire passage formed in a connector housing;

an electric wire insertion hole formed on an inner periphery of said main body, for insertion of an electric wire into the electric wire insertion hole;

a tapered sealing annular projecting portion formed on an outer periphery of an end portion of the main body on an opposite side to an insertion side of the main body, said projecting portion having an outside diameter increasing toward a direction opposite to said insertion side and an outside diameter of an end portion of said projecting portion being greater than an inside diameter of said electric wire passage; and an annular bulge portion formed in an end portion of said electric wire insertion hole on the opposite side to said insertion side, the annular bulge portion including a hole edge portion formed in a corner shape and having an inside diameter smaller than an outside diameter of said electric wire.

11. A waterproof rubber tap comprising:

a main body shaped in cylindrical form, for insertion into an electric wire passage formed in a connector housing;

an electric wire insertion hole formed on an inner periphery of said main body, for insertion of an electric wire into the electric wire insertion hole;

a tapered sealing annular projecting portion formed on an outer periphery of an end portion of the main body on an opposite side to an insertion side of the main body, said projecting portion having an outside diameter increasing toward a direction opposite to said insertion side and an outside diameter of an end portion of said projecting portion being greater than an inside diameter of said electric wire passage;

a cylindrical portion continuously provided with the end portion of said sealing annular projecting portion, said cylindrical portion having an outside diameter substantially equal to the outside diameter of the end portion of said sealing annular projecting portion, said end portion of said annular projecting portion being at the opposite side to said insertion side of the main body; and wherein said cylindrical portion includes a tapered hole having one end connected continuously with said electric wire insertion hole and the other end thereof having a diameter larger than that of the one end, and a plurality of water drain passages respectively extending from said tapered hole through an outer periphery of said cylindrical portion.

12. A waterproof rubber tap comprising:

a main body shaped in cylindrical form, for insertion into an electric wire passage formed in a connector housing;

an electric wire insertion hole formed on an inner periphery of said main body, for insertion of an electric wire into the electric wire insertion hole;

a tapered sealing annular projecting portion formed on an outer periphery of an end portion of the main body on an opposite side to an insertion side of the main body, said projecting portion having an outside diameter increasing toward a direction opposite to said insertion side and an outside diameter of an end portion of said projecting portion being greater than an inside diameter of said electric wire passage;

a cylindrical portion continuously provided with the end portio of said sealing annular projecting portion, said cylindrical portion having an outside diameter substantially equal to the outside diameter of the end portion of said sealing annular projecting portion, said end portion of said annular projecting portion being at the opposite side to said insertion side of the main body; and wherein a round portion is formed in a boundary portion between said end portion of said sealing annular projecting portion and the cylindrical portion.

* * * * *